(12) United States Patent
Ben Asher et al.

(10) Patent No.: US 8,186,589 B2
(45) Date of Patent: May 29, 2012

(54) UAV DECISION AND CONTROL SYSTEM

(75) Inventors: Yosef Ben Asher, Kiryat Tivon (IL);
Sharoni Feldman, Haifa (IL); Pinchas Gurfil, Haifa (IL)

(73) Assignees: Carmel-Haifa University Economic Corporation Ltd., Haifa (IL); Technion Research and Development Foundation Ltd., Haifa (IL)

( * ) Notice: Subject to any disclaimer, the term of this patent is extended or adjusted under 35 U.S.C. 154(b) by 630 days.

(21) Appl. No.: 12/160,779

(22) PCT Filed: Jan. 10, 2007

(86) PCT No.: PCT/IL2007/000038
§ 371 (c)(1),
(2), (4) Date: Jun. 4, 2009

(87) PCT Pub. No.: WO2007/080584
PCT Pub. Date: Jul. 19, 2007

(65) Prior Publication Data
US 2010/0163621 A1    Jul. 1, 2010

Related U.S. Application Data

(60) Provisional application No. 60/757,886, filed on Jan. 11, 2006.

(51) Int. Cl.
*G06F 19/00* (2006.01)

(52) U.S. Cl. .................... 235/411; 235/413
(58) Field of Classification Search .............. 231/411, 231/412, 413; 701/23, 25, 36, 200
See application file for complete search history.

(56) References Cited

U.S. PATENT DOCUMENTS

| | | | |
|---|---|---|---|
| 6,751,661 B1 | 6/2004 | Geddes | |
| 6,850,173 B1 | 2/2005 | Steinbrecher | |
| 7,089,218 B1 | 8/2006 | Visel | |
| 7,123,169 B2 * | 10/2006 | Farmer et al. | 340/945 |
| 7,415,331 B2 * | 8/2008 | Dapp et al. | 701/25 |
| 2004/0030571 A1 * | 2/2004 | Solomon | 705/1 |

* cited by examiner

*Primary Examiner* — Daniel St.Cyr
(74) *Attorney, Agent, or Firm* — Browdy and Neimark, PLLC

(57) ABSTRACT

The present invention relates to a hierarchical system and method for task assignment (TA), coordination and communication of multiple Unmanned Aerial Vehicles (DAV's) engaging multiple attack targets and conceives an ad-hoc routing algorithm for synchronization of target lists utilizing a distributed computing topology. Assuming limited communication bandwidth and range, coordination of UAV motion is achieved by implementing a simple behavioral flocking algorithm utilizing a tree topology for target list routing. The TA algorithm is based on a graph-theoretic approach, in which a node locates all the detectable targets, identifies them and computes its distance to each target. The node then produces an attack plan that minimizes the sum of distances of the UAV's in the subtree of a given node to the targets.

20 Claims, 7 Drawing Sheets

Assignment
 Assignment cancellation

△ UAV
○ TARGET

Fig. 3A
Fig. 3B
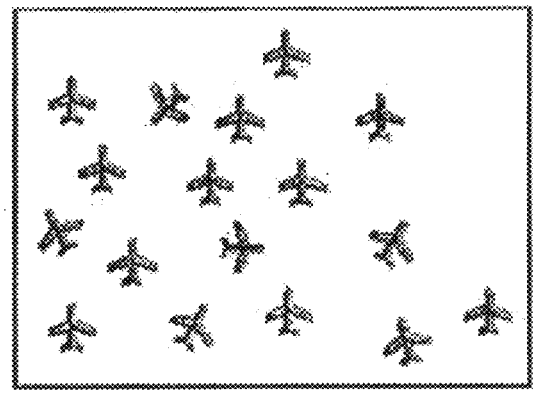
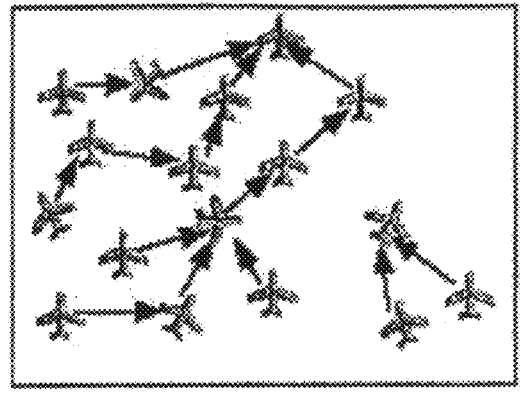
Fig. 4A
Fig. 4B
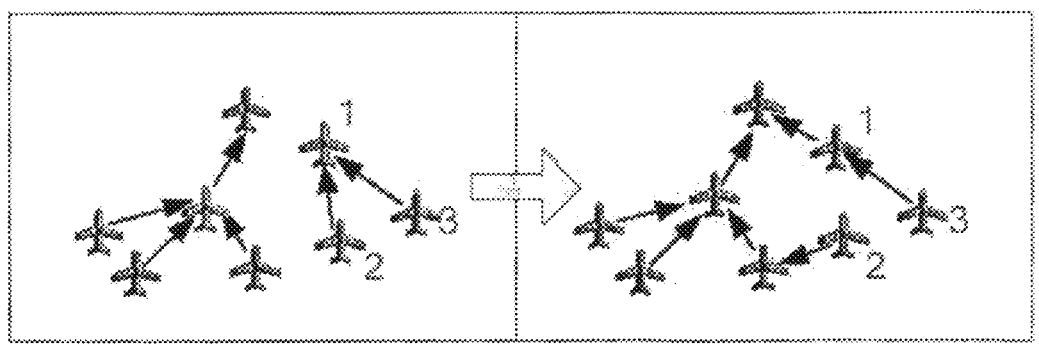

Assignment     △ UAV

Assignment cancellation     ○ TARGET

Assignment

Assignment cancellation

UAV

TARGET

UAV DECISION AND CONTROL SYSTEM

FIELD OF THE INVENTION

The present invention relates to a system for coordination and communication of multiple Unmanned Aerial Vehicles (UAV's) engaging multiple attack targets.

BACKGROUND OF THE INVENTION

The problem of design, development and control of multi-agent systems has been studied in recent years for many applications. In particular, the use of systems consisting of multiple autonomous robots or unmanned aerial vehicles (UAV's) has been proposed in order to meet the requirements of complex missions. Control, communication and decision support systems for UAV's constitute rapidly evolving research and development fields, as indicated by the Department of Defense UAV Roadmap 2002-2027. The use of groups of cooperating UAV's in order to perform various missions is currently studied throughout the world and is considered a main research goal by the United States Air Force Research Laboratory (AFRL).

Using a cooperative group of UAV's for autonomously attaining a given goal requires that each agent assume a certain task at a given time. The global result of the group of UAV's acting together is the execution of a mission, e.g. search and attack, comprising the tasks of search (look for a suspected target), identification (determine that the suspected target is a legitimate target), track (update the target location) and attack (launch munitions).

Assigning multiple UAV's to perform these tasks according to their capabilities is a challenge that requires the development of specialized algorithms. These algorithms may be classified into two main types: optimal and heuristic. While optimal algorithms yield better results in terms of task assignment, they are usually more sensitive to system uncertainties, enemy behavior, and environment changes. Heuristic algorithms, on the other hand, are usually sub-optimal but more robust. It would be desirable to develop a heuristic task assignment (TA) algorithm, which is robust to changes in the UAV group properties. An issue strongly related to cooperative UAV motion is flocking (also referred to as formation flying). Prior art simulated biological flocking behavior is based on cohesion (agents converge onto a given point), alignment (velocity matching in order to move at a give direction), collision avoidance (preventing an agent from colliding with other agents), obstacle avoidance (steering the agents away from obstacles) and migration (path following). It would be highly desirable to implement a behavioral flocking model for UAV's in order to avoid collisions and improve mission execution by facilitating wide theater coverage.

SUMMARY OF THE INVENTION

The present invention relates to a hierarchical multiple UAV decision and control system for task assignment, coordination and communication of multiple armed UAV's engaging multiple targets in an arbitrary theater. The system comprises flocking means based on a behavioral heuristic algorithm that controls the velocity and heading of the UAV's so that each UAV communicates with its closest neighbors only. Control information comprising flocking data and attack target list propagates from node to node using a tree management or hierarchical protocol.

The present invention thus relates to a hierarchical multiple UAV decision and control system comprising two or more armed UAV's dispatched onto a theater environment in order to search, detect and attack time-critical attack targets, and at least two of the following means:

(i) flocking means based on a behavioral heuristic algorithm wherein the algorithm controls the velocity and heading of the UAV's and is configured so that each UAV communicates with its closest neighbors only, and control information comprising flocking data propagates from node to node using a tree management or hierarchical protocol;

(ii) wireless ad-hoc communications means between the UAV's as follows: for communicating attack target list and flocking information both from the root downstream towards other nodes in the sub-trees and from each node upstream towards the root; the root node gathers task assignment and flocking data calculated by its sub-trees, calculates global functions, task assignment and flocking data for the tree; the root node distributes the global functions, task assignment and flocking data back to its sub-trees; in conditions where communication between the UAV's is constantly disrupted due to dynamic changes in the field, the constant flow of upstream and downstream data improves the overall efficiency of the UAV's in the tree; and (iii) task assignment means configured so that each UAV, using a graph-theoretic approach, locates all detectable attack targets; identifies the attack targets; computes the distance to each of the attack targets; and produces an attack plan based on system parameters, such that the attack plan optimizes the distances between said UAV's to the attack targets.

The system of the invention also comprises wireless ad-hoc communications means between the UAV's for communicating attack target list and flocking information both from the root downstream towards other nodes in the sub-trees and from each node upstream towards the root. The root node gathers task assignment and flocking data calculated by its sub-trees, calculates global functions, task assignment and flocking data for the tree. The root then distributes the global functions, task assignment and flocking data back to its sub-trees. This continuous upstream and downstream flow of task assignment and flocking data for each node gradually updates the task assignment and flocking for all nodes in the same tree to reflect more decisions and considerations optimized for the global group.

The flocking algorithm relates to cohesion (agents or nodes converge onto a given point), alignment (velocity matching in order to move at a give direction), collision avoidance (preventing an agent or node from colliding with other agents or nodes), obstacle avoidance (steering the agents or nodes away from obstacles) and migration (path following).

The system further comprises task assignment capabilities configured so that each UAV, using a graph-theoretic approach, locates all detectable attack targets; identifies the attack targets as valid targets; computes the distance to each of the identified attack targets; and produces an attack plan based on several system parameters such that the attack plan optimizes the distances between the UAV's to the identified attack targets.

Some of the system parameters taken into account for calculating an optimized attack plan include: movement vector of each attack target, movement vector of each UAV, types of weapons carried by each UAV, quantity and type of ammunition left for each UAV, future estimated position of each attack target after one or more engagements, future estimated position of each UAV after one or more engagements, and prioritization of attack targets.

BRIEF DESCRIPTION OF THE DRAWINGS

FIGS. 3A-3B present two stages of the tree fusion process: the initial state and final organization to trees.

FIGS. 4A-4B illustrate the fusion process of two trees.

DETAILED DESCRIPTION OF THE INVENTION

Figure 1:
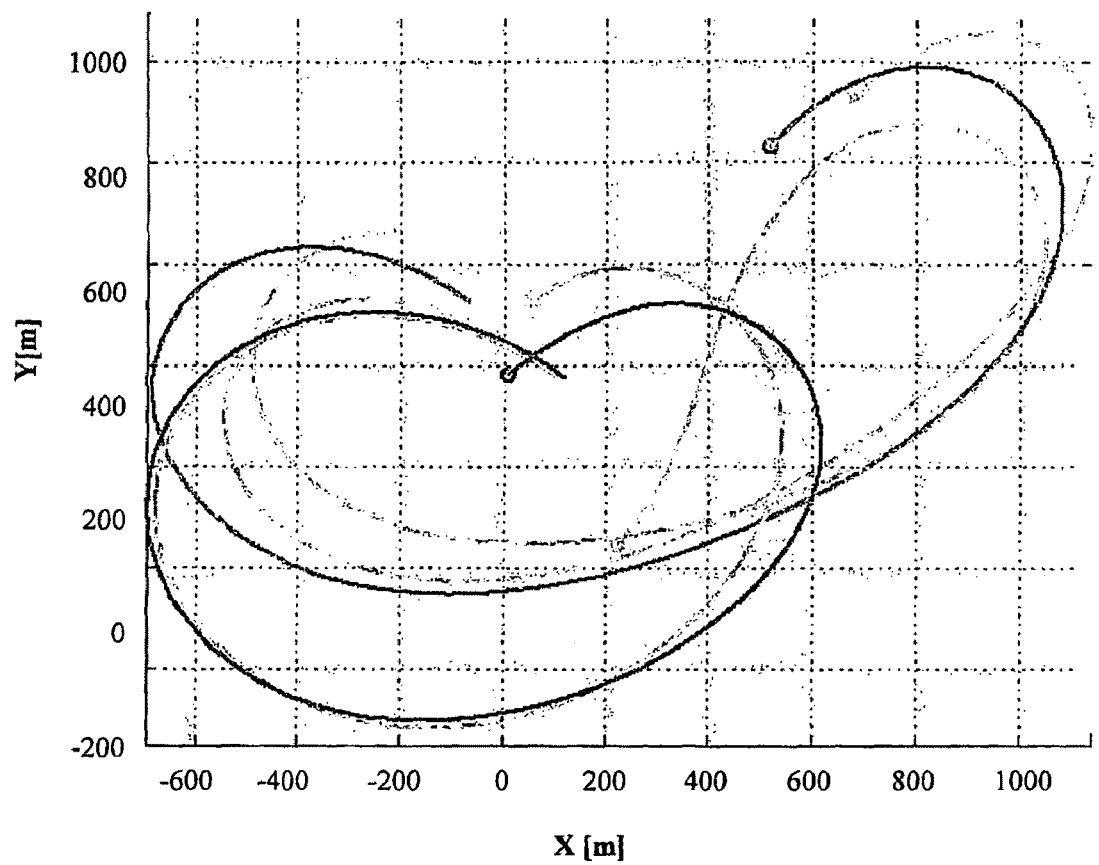
FIG. 1 illustrates a flocking scenario, implementing cohesion, alignment and collision avoidance.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In one aspect, the present invention relates to a hierarchical multiple UAV decision and control system conceived using an algorithm for task assignment, coordination and communication of multiple UAV's engaging multiple targets in an arbitrary theater, including an ad-hoc routing algorithm for synchronization of target lists and flocking information based on a distributed communication topology.

In conditions of limited communication bandwidth and limited communication range, coordination of UAV motion is achieved by implementing a simple behavioral flocking algorithm utilizing a tree topology for target list routing. This algorithm achieves feasible theater coverage while preventing collisions and enabling coordinated motion of multiple UAV's. The heuristic-reactive nature of the flocking algorithm reduces computational complexity and is robust to initial uncertainties in target location and theater characteristics.

In one embodiment of the present invention, the task assignment (TA) algorithm is based on a graph-theoretic approach, in which a node locates all the detectable targets, identifies them and computes its distance to each target. The node then produces an attack plan based on system parameters that optimizes the distances of the UAV's in the sub-tree of a given node to the attack targets.

In another aspect of the present invention, a hierarchical multiple Unmanned Aerial Vehicle (UAV) decision and control system comprises flocking means based on a behavioral heuristic algorithm wherein said algorithm controls the velocity and heading of the UAV's and is configured so that each UAV communicates with its closest neighbors only, and control information comprising flocking data propagates from node to node using a tree management or hierarchical protocol.

The flocking algorithm in use is an implementation of Reynolds' behavioral algorithm. Let $U_k \in G$ denote some UAV constituting a node in the graph G. $U_k$ calculates its desired velocity as follows:

$$v_d^k = \sum_{i=1}^{4} w_i^k v_i^k \quad v_d^k \in R^3$$

Where w is a constant scalar weight function, k is the UAV index and i is the algorithm law index, defined by the following flocking rules:

1: i=Cohesion; commands the UAV to converge onto the center of the flock, computed by each UAV from the data communicated to it by the other UAV's. We denote the desired cohesion velocity for k U by 1 k v, and by k x the position vector of k U. The cohesion velocity command may be therefore written as $$v_1^k = \|v^k\| \cdot \frac{(x_{avg}^k - x^k)}{R_{ref}},$$

Where $\|\cdot\|$ denotes the Euclidian vector norm, ref R is a reference distance, usually related to the maximum payload detection range, representing the effective area of the UAV payload, and $$x_{avg}^k = \frac{\sum_{j=1}^{n} r_1^{jk} x^j}{\sum_{j=1}^{n} r_1^{jk}},$$

Where $r_1^{jk}$ is the cohesion rule weight for $U_k$ relative to $U_j$, given by $$r_1^{jk} = r_1(t, x^k, x^j).$$

n denotes the number of nodes of some sub-tree $G' \in G$, and not necessarily the total number of UAV's, to be denoted by N.

Although $r_1^{jk}$ may be time dependant, it is more likely that it would be directly dependant upon the relative position, increasing as the relative distance between the UAV's decreases, or remain constant.

i=2: Alignment; matches the UAV's velocity vector to the mean velocity vector of the group. Alignment therefore attempts to steer the UAV's to fly in parallel to each other. We denote the desired alignment velocity for $U_k$ by $v_2^k$, and let $r_2^{jk}$ be the alignment weight for $U_k$ relative to $U_j$, so that $$v_2^k = v_{avg}^k = \frac{\sum_{j=1}^{n} r_2^{jk} v^j}{\sum_{j=1}^{n} r_2^{jk}}$$

and $$r_2^{jk} = r_2(t, x^k, x^j).$$

Similarly to $r_1$, $r_2$ may be constant, time-dependant, or a function of the relative distance between $U_k$ and $U_j$ i=3: Collision avoidance; restricts the UAV from colliding with its nearest neighbors. To that end, $U_k$ calculates its desired collision avoidance velocity, $v_3^k$, relative to the other UAV's according to the formula $$v_3^k = \|v^k\| \frac{\sum_{j=1}^{n} r_3^{jk} \cdot (x^j - x^k)/R_{ref}}{\sum_{j=1}^{n} r_3^{jk}}, \; \forall \; j \neq k,$$

where $r_3^{jk}$ is the collision avoidance rule weight of $U_k$ avoiding collision with $U_j$, and $x_j$ and $x_k$ are the position vectors of $U_j$ and $U_k$, respectively. The weight function $r_3^{jk}$ is likely to be dependant upon the relative distance between $U_k$ and $U_j$, equaling 1 for the closest neighbor to UAV k and 0 for all other UAV's. The desired velocity (1) is translated into acceleration using the following kinematic equation:

$$a^k(t) = \frac{[(v^k \times v_d^k) \times v^k]}{\|v^k\|^2 \|v_d^k\|} g \sqrt{(n_{max}^k)^2 - 1}, \quad (8)$$

where $v^k \epsilon \, i_3$ and $v^k_d \epsilon \, i_3$ are the current and desired velocity of $U_k$, respectively, and $n^k_{max}$ is the maximal load factor of $U_k$. The term $v^k \times v^k_d$ in Eq. (8) yields a vector perpendicular to the plane defined by the velocity vectors $v^k$ and $v^k_d$. This perpendicular vector is then vector multiplied again by $v_k$ to define the direction, perpendicular to $v^k$, in which the UAV will accelerate in order to reach the desired velocity $v^k_d$. The quotient defines a unit vector in the desired maneuver direction, and then multiplied by the UAV maximal load factor to give the maneuver magnitude. This acceleration is integrated into velocity and position using the kinematic model:

$$v^k[t(i)+\Delta t]=v^k[t(i)]+a^k[t(i)]\Delta t$$

$$x^k[t(i)+\Delta t]=x^k[t(i)]+v^k[t(i)]\Delta t \quad (9)$$

FIG. 1 illustrates a flocking scenario, implementing cohesion, alignment and collision avoidance.

Figure 2:
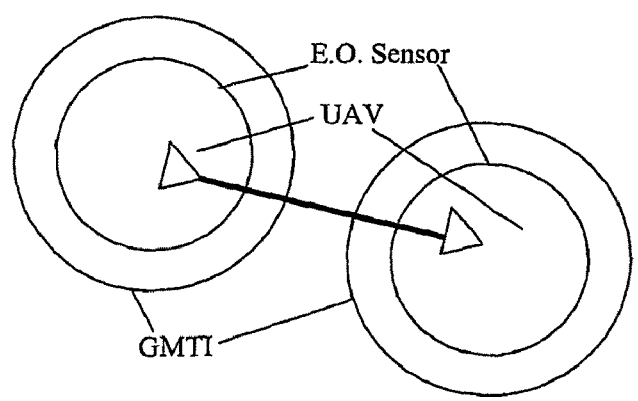
FIG. 2 depicts the field-of-view (FOV) of two UAV's with a radio connection and illustrates the sensor detection radius.

Every UAV is equipped with two types of sensors. A first sensor is used to search and identify attack targets. Attack targets may be either still or in movement. A preferred first sensor is a Ground Moving Target Indicator (GMTI) that detects vehicle movement. The second sensor is used to track identified attack targets and to guide missiles launched against those attack targets. The Electro Optical (EO) sensor is a preferred second sensor to track the target and guide the missiles. The detection radius of the GMTI is larger than the detection radius of the EO sensor. FIG. 2 depicts the field-of-view (FOV) of two UAV's with a radio connection and illustrates the sensor detection radius.

According to another aspect of the present invention, a wireless ad-hoc communications method is disclosed for communicating between multiple UAV's organized in a hierarchical decision tree structure, the method comprising the steps of:
  (i) communicating attack target list and flocking information both from the root downstream towards other nodes in the sub-trees and from each node upstream towards the root;
  (ii) gathering by the root node task assignment and flocking data calculated by its sub-trees, calculating global functions, task assignment and flocking data for the tree; and
  (iii) distributing by the root node said global functions, task assignment and flocking data back to its sub-trees.

The metrical routing algorithm (MRA) is one implementation of an ad-hoc communication protocol between the UAV's for communicating target list and flocking information. The MRA protocol is a hybrid ad-hoc protocol in the sense that some traffic control is used to maintain the mapping of the communicating nodes. The small overhead of the MRA protocol used to maintain the mapping is a worthy investment, as the MRA is capable of handling successfully a demanding traffic load under a high node density and fast node movement. The MRA organizes the nodes in rooted trees in order to find short session paths between nodes on the tree. The algorithm attempts to minimize the number of trees by fusing separate adjacent trees into a single tree. As long as any node in one tree is not in the transmission range of any node in the other trees, the trees will function autonomously. As soon as a radio connection is created between two nodes, the trees will be fused into a single tree.

All nodes run the same protocol implementing the MRA. As nodes emerge, disappear and move in or out of range of other nodes, there is need to update the trees. A primary task of the algorithm is to identify these changes and adapt the tree structure to the new state.

The MRA algorithm organizes the nodes in the field in rooted trees. Only nodes that belong to the same tree can create sessions among themselves. To ensure maximal connectivity, all nodes will try to organize themselves in a single tree. Every node in the field has a unique node-ID (similar to a phone number or an IP address) and virtual coordinates that may change depending on the changes in the tree structure. Every tree is identified by a "tree name" which is the ID of the root node. Nodes periodically send beacons, termed hello messages. Every node that receives a beacon checks whether the node that sent the beacon belongs to a different tree. If the nodes belong to different trees, they initiate a fusion process that fuses the separate trees into a single tree.

In another embodiment of the present invention, wireless ad-hoc communication means use the Metrical Routing Algorithm configured to:
  organize all nodes in the field as rooted trees;
  only nodes that belong to the same tree can create sessions among themselves;
  all nodes try to organized themselves in a single tree;
  every node in the field has a unique node ID and virtual coordinates can change depending on the changes in the tree structure;
  every tree is identified by the tree name which is the ID of the root node;
  nodes periodically send beacons, every node that receives a beacon checks whether said beacon comes from a node in a different tree; and
  if said beacon comes from a node belonging to a different tree then a fusion process is initiated between the two trees according to a fusion protocol in order to fuse the two trees into a single tree.

The fusion protocol should satisfy the following properties:
  1. The protocol should not cause active sessions to break;
  2. Eventually (assuming no dynamic changes occur) all trees with nodes within transmission range must fuse into a single tree;
  3. When two trees are being fused, most updates should be made to the nodes of the smaller tree (in terms of the number of nodes);

4. The protocol should maximize the number of nodes that migrate from one tree to another in every step (yielding parallel fusion);

5. The protocol is fully distributed with no central bottlenecks, namely it is defined at the level of pairs of nodes.

Initially, every node forms a separate tree of size 1. Every node in the tree can autonomously migrate to a neighboring tree regardless of the node position in the tree. The migrating node gets new coordinates in its new tree according to the node's new position. Naturally, when a node migrates from one tree to a new tree, it may carry along its neighboring nodes (since it belongs now to a bigger tree). In the macro view, the migration of the single nodes looks like a fusion of smaller trees into larger ones. FIG. 3 presents two stages of the tree fusion process: The initial state shown in FIG. 3A and final organization to trees shown in FIG. 3B (assuming no significant node movements occurred during this process). The two separate trees in FIG. 3B cannot fuse because there are no two nodes within transmission range interconnecting the trees.

The fusion process of two trees is parallel, that is, at any given time step multiple nodes of the smaller tree join the larger tree, as depicted by FIGS. 4A and 4B showing two separate trees in FIG. 4A joined to a single tree in FIG. 4B. The implementation of the flocking and TA algorithms is based on the tree structure. Every tree runs these algorithms autonomously, as it cannot necessarily communicate with other trees. Existence of such communication will initiate a merge process that will ultimately result in a single tree.

The terms "tree", "sub-tree", "root" and "nodes" as used herein should not be interpreted as strictly belonging to a tree structure hierarchy. Rather the invention encompasses any hierarchical structures, a tree structure being one implementation presented here for illustration only. For example, a matrix structure could easily be used instead of a tree structure in the invention.

Each UAV communicates with its closest neighbors only and is unable to get a global view of the heading and velocity of the entire flock. The control information including the flocking data propagates from node to node using the tree management protocol.

The tree structure created by the MRA algorithm renders the root as the node that can gather data from its sub-trees, calculate global variables and distribute the global variables back to its sub-trees. Two distinctive data streams exist in the MRA protocol: up stream, moving from the tree leaves or sub-trees towards the root; and downstream, moving data from the root towards the leaves.

Figure 5:
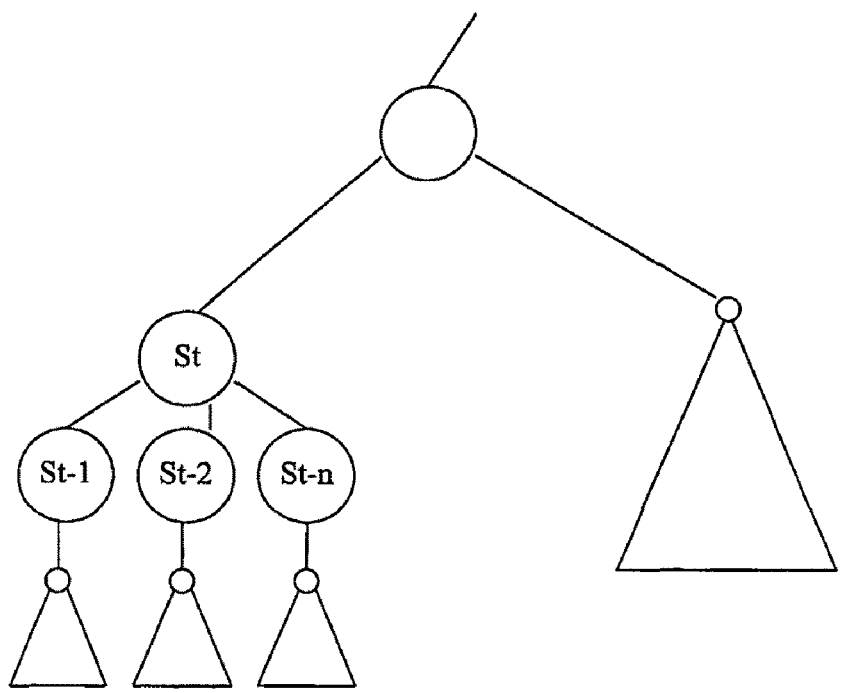
FIG. 5 illustrates how streams move stepwise from the father node to its children or vice-versa.

The streams move stepwise from the father node to its children or vice-versa, as shown in FIG. 5. Every sub-tree root (node St in FIG. 5) gets the following values from its children (nodes St-1, St-2 ... St-n in FIG. 5): $W_i$—the weight of St-i, which is the number of nodes forming sub-tree St-i; and $x_i$—the average position vector of sub-tree St-i. In addition, let $x_s$ be the position vector of node $S_t$. The average position vector that node $S_t$ will send to its father is therefore given by $$x_{St} = \frac{x_s + \sum_i W_i x_i}{1 + \sum_i W_i}$$

The iterative process terminates at the root node. The root calculates its own flocking velocity, which is also the flocking velocity for the tree, and communicates it downstream. If the root node is lost, then a new root will be declared. The new root will then take over the tasks of the lost root.

According to another aspect of the present invention, a hierarchical multiple UAV decision and control system comprises task assignment capabilities wherein each UAV, using a graph-theoretic approach, locates all detectable attack targets; identifies said attack target; computes the distance to each of said attack targets; and produces an attack plan that optimizes the distances between said UAV's to said attack targets.

In one embodiment of the present invention, the task assignment (TA) algorithm relies on the arrangement of the UAV's in trees and on the intercommunication capabilities among the UAV's using ad-hoc routing. Every UAV is autonomous, performing autonomous decisions and behaving according to the changes in the theater. However, when a UAV becomes a node in a tree created by the MRA, it upgrades its behavior and acts as a member of a group.

The problem to be solved is computing a targeting plan for a set of moving agents $G=\{U_1, U_2, \ldots, U_N\}$ (UAV's in our case) attacking moving targets $A=\{T_1, T_2, \ldots, T_m\}$ (vehicles in our scenario). A distributed solution is implemented over a special setting where the communication among $U_1, U_2, \ldots, U_N$ is carried out by an ad-hoc network. Using ad-hoc communication yields a complex and challenging setting wherein the following factors should be considered:

Ad-hoc communication implies that communication links among $U_1, U_2, \ldots, U_N$ are constantly changing. Thus, there is no guarantee that a given subset of G that was previously connected will remain connected.

At any stage new information regarding (a) new targets, (b) changes in the location of known targets and (c) new $U_i$'s that are closer to a given target can pop-up.

It is desired not to fix a targeting plan (i.e., assign targets to each $U_i$) in advance, but rather adopt the reactive setting wherein at any time step only a portion of the targets are assigned to some subset $G' \epsilon G$.

Centralized algorithms where all the data (location of $U_1, U_2, \ldots, U_N$ and $T_1, T_2, \ldots, T_m$) is collected and then processed may fail to obtain good solutions due to disrupted communication and long communication delays.

The notion of an "optimal" solution in this setting is therefore ambiguous, as a few feasible solutions may be contemplated. To illustrate this observation, let $d_{ij}$ denote a distance metric between some $U_i \epsilon G$ and $T_j \epsilon A$. Different bipartite graphs resulting from minimization of distinct performance measures can be considered:

1. $GA_i$, resulting from minimizing the maximum distance between $U_i \epsilon G$ and $T_j \epsilon A$, assuming that all targets are attacked by the UAVs (each UAV is assigned to a different target), $$GA_1 : d_1^* = \min \max_{i \in G, j \in A} d_{ij} \qquad (11)$$

2. $GA_2$, resulting from minimizing the sum of distances between $U_i \epsilon G$ and $T_j \epsilon A$, assuming again that all targets are attacked by the UAVs (each UAV is assigned to a different target), $$GA_2 : d_2^* = \sum_{i \in G, j \in A} d_{ij} \qquad (12)$$

In certain scenarios, one may choose to attack only a subset of all targets, A'∈A. In this case Eqs. (11) and (12) should be modified into $$GA'_1 : d_1^{*\prime} = \min \max_{i \in G, j \in A'} d_{ij} \qquad (13)$$

and $$GA'_2 : d_2^{*\prime} = \sum_{i \in G, j \in A'} d_{ij}, \qquad (14)$$

respectively.

Figure 6:
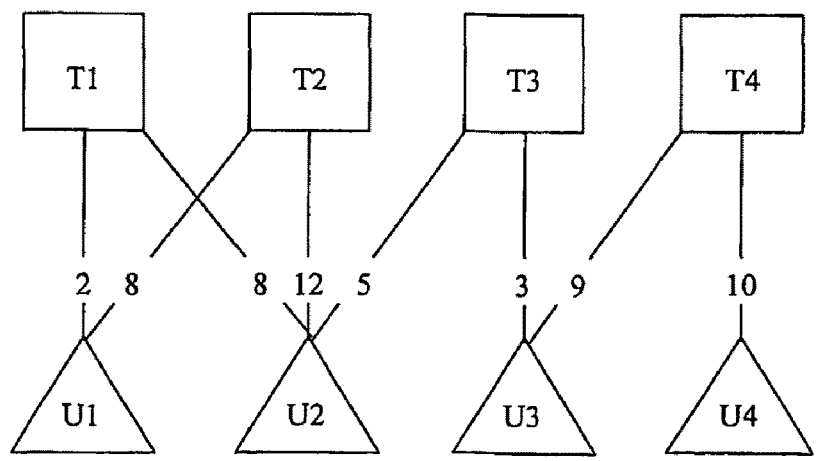
FIG. 6 illustrates a bipartite graph showing distances of UAV's and targets.

Consider, for example, the bipartite graph of FIG. 6, showing the distance metrics between four UAVs ($U_1$, $U_2$, $U_3$, $U_4$) and targets ($T_1$, $T_2$, $T_3$, $T_4$). The optimal solution in the sense of Eq. (11) is $GA_1 = \{U_1 \rightarrow T_2, U_2 \rightarrow T_1, U_3 \rightarrow T_3, U_4 \rightarrow T_4\}$ with $d^*_1 = 10$, $d_2 = 29$; the optimal solution in the sense of Eq. (12) is $GA_2 = \{U_i \rightarrow T_i, i=1, \ldots, 4\}$, with $d_1 = 12$, $d^*_2 = 27$; and the optimal solution in the sense of Eq. (13) is $GA_1' = \{U_1 \rightarrow T_1, U_2 \rightarrow T_3, U_3 \rightarrow T_4\}$, with $d^* = 9$, $d_2 = 16$. In the last case, targeting $T_2$ can be determined at the next stage/step where possibly there will be new distance metrics to choose from.

In one embodiment of the present invention, optimization of the distances between said UAV's to said attack targets is done by minimizing the sum of distances of said UAV's to said attack targets.

The TA capabilities rely on the arrangement of the UAV's in trees and on the intercommunication capabilities among the UAV's using ad-hoc routing. Every UAV is autonomous, performing autonomous decisions and behaving according to the changes in the theater. However, when a UAV becomes a node in a tree created by the MRA, it upgrades its behavior and acts as a member of a group.

In one embodiment of the present invention task assignment capabilities are configured so that:
  each node Ui in a tree (or a sub-tree) locates all the detectable attack targets, identifies them and computes its distance to each attack target; the attack target ID is the attack target location;
  at each time step t (i), a node v constructs a weighted bipartite graph $B_v[t(i)]$ representing the distances between each Ui and Tj related to the sub-tree rooted at v;
  three events that lead to the creation of a new bipartite graph $B_v[t(i)]$ include: (a) a new $B_u[t(i+1)]$, is received from one of v's children; (b) a new, $B_{Fv}[t(i+1)]$ is received from v's father; and (c) there is a change in the attack target list L of v, as a new attack target is detected or an old attack target disappears or is destroyed; In each of these events, a new $B_v[t(i+1)]$, is computed by merging $B_u[t(i+1)]$ or $B_{Fv}[t(i+1)]$ or L into $B_v[t(i+1)]$;
  the node v computes a minimum weighted matching $M_v[t(i+1)]$ of $B_v[t(i+1)]$ obtaining an attack plan that minimizes the sum of distances of the UAV's in the sub-tree of v to their attack targets;

$$d^* = \sum_{i,j \in B_v[t(i+1)]} d_{ij}$$

when a node v receives an attack plan $M_{Fv}[t(i+1)]$ from its father, it checks to see if it is assigned a new attack target; if so, it abandons its current attack target and starts to engage the recommended attack target; and the attack plan $M_{Fv}[t(i+1)]$, is sent to all the children of the current node.

When a target is destroyed or disappears, it will be removed from each $B_v(t)$, since these are propagated only up the MRA trees.

The implementation of the target selection algorithm uses a single data structure to transfer the bipartite graph $B_v(t)$ and the attack graph $M_v[t(i+1)]$. This data structure is the Target List (TL). A simplified TL model is depicted by FIG. 7. This model ignores the parallelism in the TL flow between the UAV's. It demonstrates the decision-making process and the decision overruling performed by higher levels of UAV's in the tree with broader views.

Figure 7A:
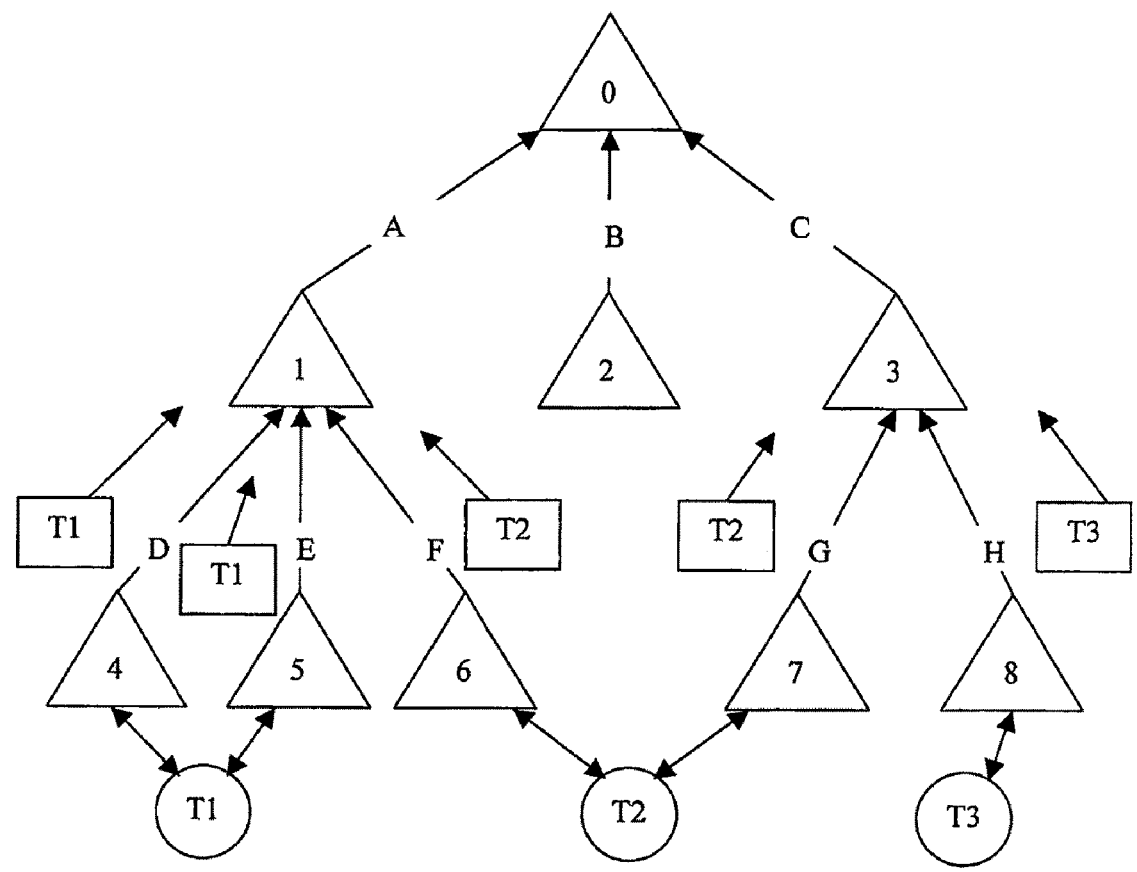
FIGS. 7A-7D illustrates a simplified task list model that explains the decision making process and the decision overruling performed by higher levels of UAV's in the tree with broader views.

FIG. 7A presents the initial phase where $U_4$ and $U_5$ have detected target $T_1$, $U_6$ and $U_7$ have detected $T_2$, and $U_8$ detected $T_3$. Every UAV that has one or more targets will autonomously select a target from the possible targets in its TL and will commence a pursuit. The current state depicted in FIG. 7A is that $U_4$ and $U_5$ are in pursuit after $T_1$, $U_6$ and $U_7$ prosecute $T_2$ and $U_8$ will pursue $T_3$. The pursuit process of the UAV's is independent of other UAV activities. This is the initial phase, where the targets were detected by the GMTI detector but are not yet within the range of the UAV missiles launch distance (i.e. within the FOV of the EO payload). Every UAV stores a TL comprising all targets known to the UAV and indications on the target state. Every UAV then sends its TL to its father and children. $U_4$, $U_5$ and $U_6$, constituting leaves in the tree, send their TL's toward node 1, which is the sub-tree father. The decision taken by $U_1$ arrives to $U_4$, which is also the UAV attacking $T_1$. $U_4$ continues its attack while $U_5$ receives the same TL from its father, and finds out that it should abort its attack on $T_1$. $U_5$ will look for an alternative target without an owner in the TL that is within its GMTI range, or will search for a new target that might emerge.

Figure 7B:
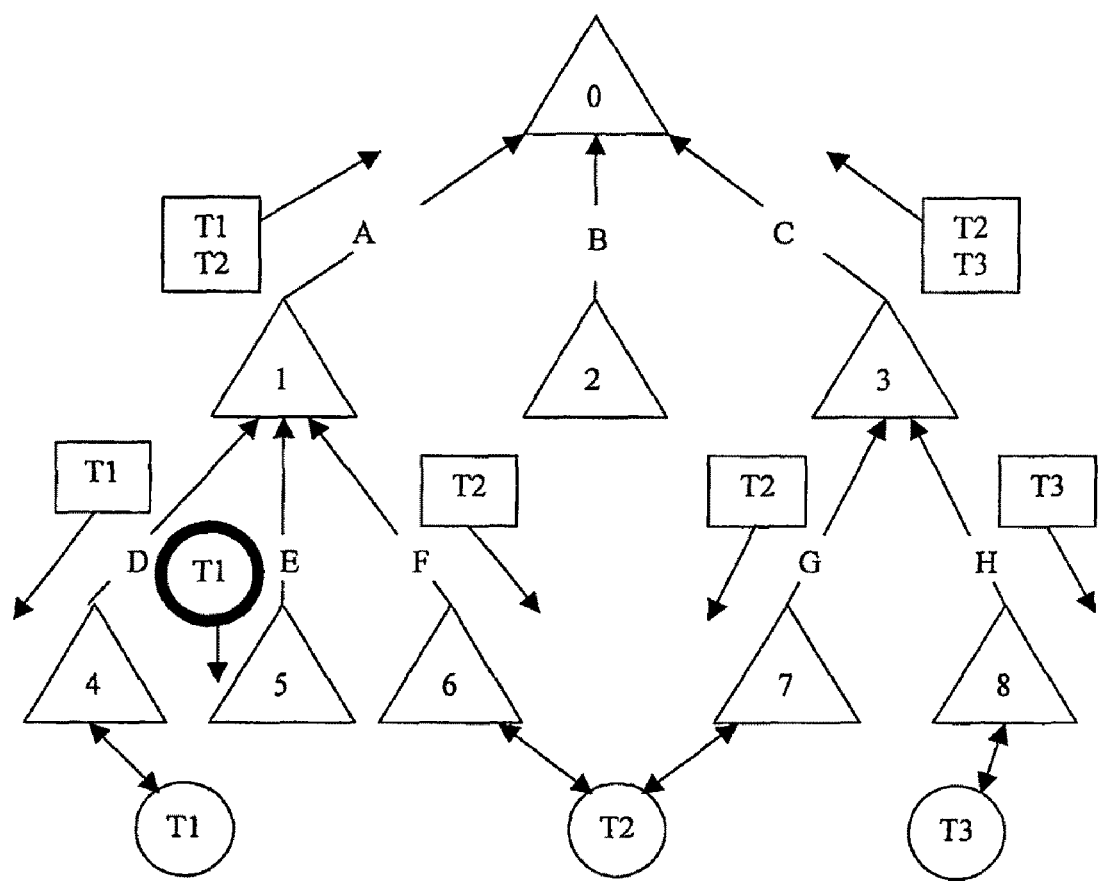

FIG. 7B presents a situation in which $U_1$ had analyzed the TLs and decided that sub-tree D will be responsible to attack $T_1$, sub-tree E will not attack $T_1$ and sub-tree F will attack $T_2$. The decisions of $U_1$ are sent to its father node 0 and its children. A similar process takes place in the other parts of the tree.

Figure 7C:
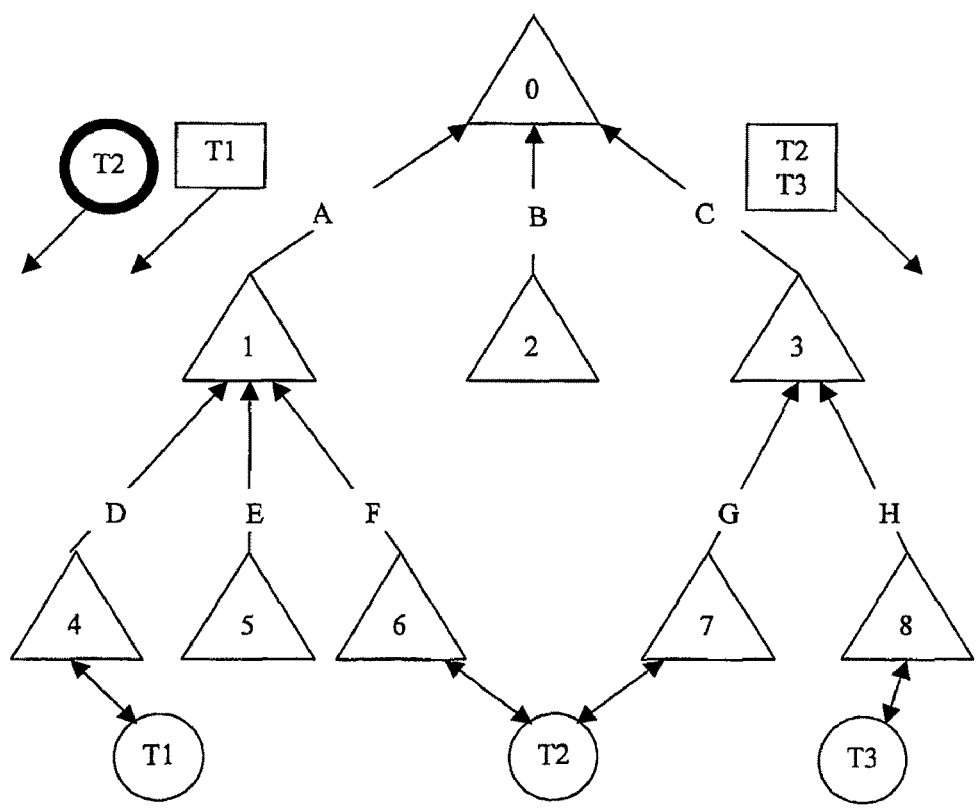
Figure 7C:
Figure 7C:
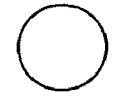

In FIG. 7C, the root distributes the results of its decisions to its children. The decisions are embedded in its TL. The decision of $U_0$ is that sub-tree C will assume the responsibility to attack $T_2$, while sub-tree A will abandon its attack. These decisions will be distributed by every sub-tree towards its children until they reach the leaves. In the meantime, $U_6$ and $U_7$ continue their pursuit after $T_2$.

Figure 7D:
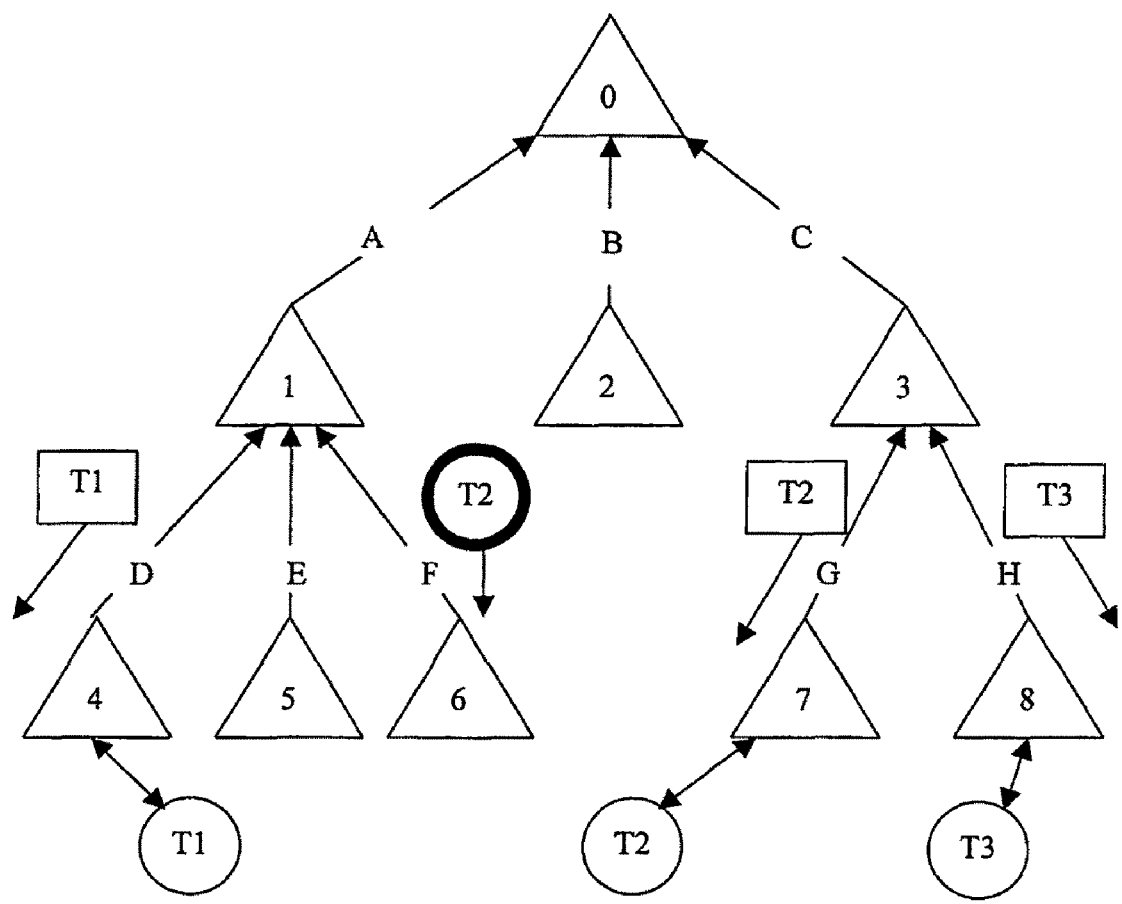
Figure 7D:
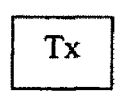
Figure 7D:
Figure 7D:
Figure 7D:

FIG. 7D presents a situation where the root decisions arrived to the attacking UAV's and $U_6$ stopped its attack on $T_2$ while $U_7$ continues its attack. The upstream and downstream flow of TL's is not affected by changes in the tree structure or by appearance of new targets.

In addition to the data describing the relations between UAVs and potential targets, the TL is used to transfer data regarding missiles that are in the course of an interception process. The distribution of this data is essential to minimize the probability that a UAV launches its last missile towards a target and declares itself as an empty UAV. A second UAV will interpret this situation as a "permission" to launch again a missile to the same target. The exchange of data regarding flying missiles will prevent the second UAV from launching a new missile to the same target until it gets a message that the missile failed to hit the target.

In one embodiment of the present invention, communication between the UAV's is constantly disrupted due to dynamic changes in the field. Disruptions occur when a new UAV joins the group, or a UAV moves out of communication range, has a communication malfunction or is destroyed.

In one embodiment of the present invention, a hierarchical multiple UAV decision and control system comprises:
(i) two or more armed UAV's dispatched onto a theater environment in order to search, detect and attack time-critical attack targets;
(ii) flocking means based on a behavioral heuristic algorithm wherein said algorithm controls the velocity and heading of the UAV's and is configured so that each UAV communicates with its closest neighbors only, and control information comprising flocking data propagates from node to node using a tree management or hierarchical protocol;
(iii) wireless ad-hoc communications means between the UAV's as follows: for communicating attack target list and flocking information both from the root downstream towards other nodes in the sub-trees and from each node upstream towards the root; the root node gathers task assignment and flocking data calculated by its sub-trees, calculates global functions, task assignment and flocking data for the tree; the root node distributes said global functions, task assignment and flocking data back to its sub-trees; in conditions where communication between the UAV's is constantly disrupted due to dynamic changes in the field, the constant flow of upstream and downstream data improves the overall efficiency of the UAV's in the tree; and
(iv) task assignment capabilities configured so that each UAV, using a graph-theoretic approach, locates all detectable attack targets; identifies said attack targets; computes the distance to each of said attack targets; and produces an attack plan based on system parameters, such that said attack plan optimizes the distances between said UAV's to said attack targets.

In another embodiment of the present invention, a hierarchical multiple UAV decision and control system comprises:
(i) two or more armed UAV's dispatched onto a theater environment in order to search, detect and attack time-critical attack targets;
(ii) flocking means based on a behavioral heuristic algorithm wherein said algorithm controls the velocity and heading of the UAV's and is configured so that each UAV communicates with its closest neighbors only, and control information comprising flocking data propagates from node to node using a tree management or hierarchical protocol; and
(iii) wireless ad-hoc communications means between the UAV's as follows: for communicating attack target list and flocking information both from the root downstream towards other nodes in the sub-trees and from each node upstream towards the root; the root node gathers task assignment and flocking data calculated by its sub-trees, calculates global functions, task assignment and flocking data for the tree; the root node distributes said global functions, task assignment and flocking data back to its sub-trees; in conditions where communication between the UAV's is constantly disrupted due to dynamic changes in the field, the constant flow of upstream and downstream data improves the overall efficiency of the UAV's in the tree.

In yet another embodiment of the present invention, a hierarchical multiple UAV decision and control system comprises:
(i) two or more armed UAV's dispatched onto a theater environment in order to search, detect and attack time-critical attack targets;
(ii) flocking means based on a behavioral heuristic algorithm wherein said algorithm controls the velocity and heading of the UAV's and is configured so that each UAV communicates with its closest neighbors only, and control information comprising flocking data propagates from node to node using a tree management or hierarchical protocol; and
(iii) task assignment capabilities configured so that each UAV, using a graph-theoretic approach, locates all detectable attack targets; identifies said attack targets; computes the distance to each of said attack targets; and produces an attack plan based on system parameters, such that said attack plan optimizes the distances between said UAV's to said attack targets.

In yet another embodiment of the present invention, a hierarchical multiple UAV decision and control system comprises:
(i) two or more armed UAV's dispatched onto a theater environment in order to search, detect and attack time-critical attack targets;
(ii) wireless ad-hoc communications means between the UAV's as follows: for communicating attack target list and flocking information both from the root downstream towards other nodes in the sub-trees and from each node upstream towards the root; the root node gathers task assignment and flocking data calculated by its sub-trees, calculates global functions, task assignment and flocking data for the tree; the root node distributes said global functions, task assignment and flocking data back to its sub-trees; in conditions where communication between the UAV's is constantly disrupted due to dynamic changes in the field, the constant flow of upstream and downstream data improves the overall efficiency of the UAV's in the tree; and
(iii) task assignment capabilities configured so that each UAV, using a graph-theoretic approach, locates all detectable attack targets; identifies said attack targets; computes the distance to each of said attack targets; and produces an attack plan based on system parameters, such that said attack plan optimizes the distances between said UAV's to said attack targets.

Although the invention has been described in detail, nevertheless changes or modifications which do not depart from the teachings of the present invention will be evident to those skilled in the art. Such changes and modifications are deemed to come within the purview of the present invention and the appended claims.

The invention claimed is:

1. A hierarchical multiple UAV decision and control system comprising two or more armed UAV's dispatched onto a theater environment in order to search, detect and attack time-critical attack targets, and at least two of the following means:
(i) flocking means based on a behavioral heuristic algorithm wherein said algorithm controls the velocity and heading of the UAV's and is configured so that each UAV can calculate the required velocity and heading independently and each UAV communicates control information comprising flocking data with said UAV's closest neighbors only;
(ii) wireless ad-hoc communications means between the UAV's as follows: for communicating attack target list and flocking information both from a root node of a tree comprising one of the UAVs, downstream towards other nodes comprising others of the UAVs in sub-trees depending from the root node and from each node upstream towards the root node; the root node gathers task assignment and flocking data calculated by the UAVs in the root's sub-trees, calculates global functions, task assignment and flocking data for the UAVs in the tree; the root node distributes said global functions, task assignment and flocking data back to the UAVs in the root's sub-trees; in conditions where communication between the UAV's is constantly disrupted due to dynamic changes in the field, the constant flow of upstream and downstream data improves the overall efficiency of the UAV's in the tree; and (iii) task assignment means configured so that each UAV, using a graph-theoretic approach, locates all detectable attack targets; identifies said attack targets; computes the distance to each of said attack targets; and independently produces an attack plan based on system parameters, such that said attack plan optimizes the distances between said UAV's to said attack targets.

2. The hierarchical system according to claim 1, wherein the system comprises two or more armed UAV's, the flocking means, the wireless ad-hoc communications means and the task assignment means.

3. The hierarchical system according to claim 1, wherein the system comprises two or more armed UAV's, the flocking means and the task assignment means.

4. The hierarchical system according to claim 1, wherein the system comprises two or more armed UAV's, the wireless ad-hoc communications means and the task assignment means.

5. The hierarchical system according to claim 1, wherein the system comprises two or more armed UAV's, the flocking means and the wireless ad-hoc communications means.

6. The hierarchical system according to claim 1, wherein said task assignment capabilities are configured so that:

(i) each node Ui in a tree (or a sub-tree) locates all detectable attack targets, identifies them and computes the distance to each attack target; the attack target ID is the attack target location;

(ii) at each time step t (i), a node v constructs a weighted bipartite graph $B_v[t(i)]$ representing the distances between each Ui and Tj related to the sub-tree rooted at v;

(iii) three events that lead to the creation of a new bipartite graph $B_v[t(i)]$ include: (a) a new $B_u[t(i+1)]$ is received from one of v's children; (b) a new $B_{Fv}[t(i+1)]$ is received from v's father; and (c) there is a change in the attack target list L of v, as a new attack target is detected or an old attack target disappears or is destroyed; In each of these events, a new $B_v[t(i+1)]$ is computed by merging $B_u[t(i+1)]$ or $B_{Fv}[t(i+1)]$ or L into $B_v[t(i+1)]$;

(iv) the node v computes a minimum weighted matching $M_v[t(i+1)]$ of $B_v[t(i+1)]$ obtaining an attack plan that minimizes the sum of distances of the UAV's in the sub-tree of v to their attack targets;

$$d^* = \sum_{i,j \in B_v[t(i+1)]} d_{ij}$$

(v) when a node v receives an attack plan $M_{Fv}[t(i+1)]$ from the node's father, it checks to see if it is assigned a new attack target; if so, it abandons the current attack target and starts to engage the assigned attack target; and (vi) the attack plan $M_{Fv}[t(i+1)]$ is sent to all the children of the current node.

7. The hierarchical system according to claim 1, wherein said system parameters include: movement vector of each attack target, movement vector of each UAV, types of weapons carried by each UAV, quantity and type of ammunition left for each UAV, future estimated position of each attack target after one or more engagements, future estimated position of each UAV after one or more engagements, and prioritization of attack targets.

8. The hierarchical system according to claim 1, wherein attack targets are identified using a first sensor.

9. The hierarchical system according to claim 8, wherein said first sensor is a Ground Moving Target Indicator radar.

10. The hierarchical system according to claim 1, wherein a second sensor tracks identified attack targets and guides missiles launched against said attack targets.

11. The hierarchical system according to claim 10, wherein said second sensor is an electro-optical sensor.

12. The hierarchical system according to claim 10, wherein attack targets, detected using a first sensor, are attacked at most once within the field-of-view of the second sensor.

13. The hierarchical system according to claim 1, wherein at least one UAV operates autonomously and calculates an independent attack target list and route autonomously when said UAV does not have any established communication links with other UAV's.

14. The hierarchical system according to claim 1, wherein flocking capabilities include: cohesion; alignment; collision avoidance; obstacle avoidance; and migration.

15. The hierarchical system according to claim 1, wherein said wireless ad-hoc communication means use the Metrical Routing Algorithm configured to:

(i) organize all nodes in the field as rooted trees;
(ii) only nodes that belong to the same tree can create sessions among themselves;
(iii) all nodes try to organized themselves in a single tree;
(iv) every node in the field has a unique node ID and virtual coordinates can change depending on the changes in the tree structure;
(v) every tree is identified by the tree name which is the ID of the root node;
(vi) nodes periodically send beacons, every node that receives a beacon checks whether said beacon comes from a node in a different tree; and
(vii) if said beacon comes from a node belonging to a different tree then a fusion process is initiated between the two trees according to a fusion protocol in order to fuse the two trees into a single tree.

16. The hierarchical system according to claim 15, wherein said fusion protocol is configured as follows:

(i) the protocol should not cause active sessions to break;
(ii) all trees with nodes within transmission range of the beacons must fuse into a single tree eventually;
(iii) when two trees are being fused, most updates should be made to the nodes of the tree with the least amount of nodes;
(iv) the highest amount of nodes should be transferred from one tree to the other in each step of the fusion protocol; and
(v) the protocol is fully distributed and defined at the level of pairs of nodes.

17. The hierarchical system according to claim 1 wherein communication between the UAV's is constantly disrupted due to dynamic changes in the field.

18. The hierarchical system according to claim 1 wherein at any given time each UAV has a valid task assignment plan.

19. The hierarchical system according to claim 1, wherein optimization of the distances between said UAV's to said attack targets is done by minimizing the sum of distances of said UAV's to said attack targets.

20. A wireless ad-hoc communications method for communicating between multiple UAV's organized in a hierarchical decision tree structure, the method comprising the steps of:
(i) communicating attack target list and flocking information both from the root downstream towards other nodes in the sub-trees and from each node upstream towards the root;
(ii) gathering by the root node task assignment and flocking data calculated by the root's sub-trees, calculating global functions, task assignment and flocking data for the tree;
(iii) calculating global functions, task assignment and flocking data for the tree;
(iv) distributing by the root node said global functions, task assignment and flocking data back to the root's sub-trees;
(v) improving the overall efficiency of the UAV's in the tree in conditions where communication between the UAV's is constantly disrupted due to dynamic changes in the field, by a constant flow of upstream and downstream data,
wherein each UAV can calculate the required velocity and heading independently and each UAV communicates control information comprising flocking data with said UAV's closest neighbors only.

* * * * *